United States Patent [19]

Speca

[11] Patent Number: 4,536,487

[45] Date of Patent: Aug. 20, 1985

[54] INTERMETALLIC COMPOUNDS OF POLYMERIC TRANSITION METAL OXIDE ALKOXIDES AND CATALYTIC USE THEREOF

[75] Inventor: Anthony N. Speca, Kingwood, Tex.

[73] Assignee: National Distillers and Chemical Corporation, New York, N.Y.

[21] Appl. No.: 578,243

[22] Filed: Feb. 8, 1984

Related U.S. Application Data

[63] Continuation-in-part of Ser. No. 209,223, Nov. 24, 1980, abandoned, Ser. No. 209,224, Nov. 24, 1980, abandoned, Ser. No. 209,225, Nov. 24, 1980, abandoned, Ser. No. 209,226, Nov. 24, 1980, abandoned, Ser. No. 209,227, Nov. 24, 1980, abandoned, Ser. No. 209,228, Nov. 24, 1980, abandoned, Ser. No. 209,229, Nov. 24, 1980, abandoned, Ser. No. 228,831, Jan. 27, 1981, abandoned, and Ser. No. 483,054, Apr. 7, 1983, Pat. No. 4,513,095.

[51] Int. Cl.$^3$ ............................................. C08F 4/64
[52] U.S. Cl. ................................. 502/119; 502/104; 502/111; 502/113; 502/115; 502/103; 502/117; 502/121; 502/132; 502/133; 502/134; 502/162; 502/171; 526/123; 526/124; 526/125; 526/139
[58] Field of Search ............... 502/111, 104, 115, 103, 502/133, 171, 119, 134, 132, 113, 121, 117, 162

[56] References Cited

U.S. PATENT DOCUMENTS

| | | | |
|---|---|---|---|
| 2,943,066 | 6/1960 | Arnold et al. | 502/349 X |
| 3,113,986 | 12/1963 | Breslow et al. | 502/103 X |
| 3,177,194 | 4/1965 | Stampa | 502/111 X |
| 3,803,105 | 4/1974 | Galli et al. | 502/107 X |
| 3,839,313 | 10/1974 | Galli et al. | 502/133 X |
| 3,998,996 | 12/1976 | Toth | 502/104 X |
| 4,105,585 | 8/1978 | Matheson | 502/111 |
| 4,174,299 | 11/1979 | Giannini et al. | 502/119 |
| 4,194,992 | 3/1980 | Corbellini et al. | 502/104 |
| 4,198,315 | 4/1980 | Birrelbach | 502/113 |
| 4,317,897 | 3/1982 | Herrmann et al. | 502/132 X |

*Primary Examiner*—Patrick P. Garvin

[57] ABSTRACT

An intermetallic compound comprising the reaction product of a transition metal and a reducing metal of a higher oxidation potential than the transition metal obtained by the reaction of a polymeric transition metal oxide alkoxide and the reducing metal in the presence of a mono- or dialkyl phosphate or mixtures thereof in which each alkyl contains up to 10 carbon atoms; and catalyst components and systems for the polymerization of alpha olefins.

21 Claims, No Drawings

INTERMETALLIC COMPOUNDS OF POLYMERIC TRANSITION METAL OXIDE ALKOXIDES AND CATALYTIC USE THEREOF

CROSS REFERENCE TO RELATED APPLICATIONS

This application is a continuation in-part of copending commonly assigned applications of the same inventive entity as follows: Ser. No. 209,223; 209,224; 209,225; 209,226; 209,227; 209,228; 209,229, all filed Nov. 24, 1980 and all now abandoned, Ser. No. 228,831, filed Jan. 27, 1981 and now abondoned; and Ser. No. 483,054, filed Apr. 7, 1983 and now Pat. No. 4,513,095.

BACKGROUND OF THE INVENTION

This invention relates to intermetallic compounds of transition metal oxide alkoxides and processes for their production. More particularly, the invention affords catalyst precursors for interreaction with halide activators to provide a catalyst component adapted for the polymerization of alpha olefins.

Polyethylene, produced by solution or slurry processes at lower pressures providing a linear high density resin, or in autoclave or tubular reactors at higher pressures, providing a long chain branched low density resin, has been an object of commercial production for many years.

It has been recognized that certain characteristics of the linear high density resins such as stiffness and abrasion resistance would usefully be combined with valuable properties of the branched low density resin such as high impact toughness and stress crack resistance, and it has been discovered that the interrelationship of these properties may be attributed in part to the nature and amount of side chain development.

Accordingly, linear low density polyethylene resins have now been produced in low pressure processes employing specialized catalyst systems, the resins being characterized by linearity and short chain branching afforded by alkene comonomers (without significant long chain branching), and offering narrow molecular weight distribution, improved strength properties, higher melt viscosity, high softening point, improved ESCR (Environmental Stress Crack Resistance) and improved low temperature brittleness. These and related properties provide advantages to the user in such applications as blown film, wire and cable coating, cast film, co-extrusion, and injection and rotational molding.

It is an objective to manufacture such linear low density resins in an economic and efficient manner under the conditions existing in slurry reactors, and to accomplish such manufacture with the provision of resin of competitive product characteristics, employing catalyst systems having user acceptable residues.

The linear olefin polymers have typically been produced using coordination catalysts of the general type disclosed by Ziegler, thus comprising a transition metal compound, usually a titanium halide admixed with an organometallic compound such as alkyl aluminum. The transition metal component may be activated by reaction with a halide promoter such as an alkyl aluminum halide. Among the improved catalysts of this type are those incorporating a magnesium component, usually by interaction of magnesium or a compound thereof with the transition metal component or the organometallic compounds, as by milling or chemical reaction or association.

It is a further object to provide a catalyst for the polymerization of alpha olefins affording a range of resin properties under various synthesis conditions.

A particular object is the preparation of linear low density polyethylene having a broadened molecular weight distribution.

BRIEF DESCRIPTION OF THE INVENTION

According to the present invention, transition metal-containing intermetallic compounds are prepared by the reaction of a transition metal alkoxide with at least one reducing metal, i.e., a metal having a higher oxidation potential than the transition metal, in the presence of certain alkyl phosphates.

The alkyl phosphates used in the present invention are mono- and dialkylphosphates in which the alkyl groups contain up to about 10 carbon atoms, and are preferably lower alkyl groups. These compounds are also described as mono- and diprotic alkyl phosphates.

Transition metal alkoxides are well known particularly titanium alkoxides, especially for their colligative properties in organic solvents; see, for example, "The Polymeric Nature of Titanium Tetraethoxide in Solution", Bradley, et al., *Inorg. Chem.*, Vol. 3, No. 8, pp. 1163–65 (1969). In general, these alkoxides form oligomers and condensation products, especially at elevated temperatures, which tend to form polymeric titanium oxide alkoxides, particularly in the course of reaction with elecron-donor reactants, as exemplified by reaction with water, i.e., hydrolysis. Apparently, similar results are obtained when these alkoxides are reacted in the presence of alkyl phosphates as already described herein. For ease of description, these materials will be referred to as polymeric oxide alkoxides of the respective transition metals.

Regardless of the particular form which the alkoxide is visualized to adopt, in practice it is sufficient to recognize that the alkoxide oligomers apparently form a series of polymeric oxide alkoxides ranging from the dimer through cyclic forms to linear polymers of up to indefinite chain length during the course of the present processs. Of course, it is expected that the polymeric oxide alkoxides can be formed separately but the ease of formation of these alkoxides in situ indicates the latter to be preferred.

The polymeric transition metal oxide alkoxides are reacted with a reducing metal having an oxidation potential higher than the transition metal. Preferably a polymeric titanium oxide alkoxide is employed together with magnesium (or calcium, potassium, aluminum or zinc), as the reducing metal.

The inventive process is accomplished by heating a mixture of the selected transition metal alkoxide, reducing metal, and alkyl phosphates to a temperature at which color change occurs and gas evolution occurs. Heating is usually continued until gas evolution ceases.

In the preferred embodiment (to which illustrative reference is made in the following text, as a matter of convenience), titanium tetra-n-butoxide (TBT) is reacted with magnesium turnings and alkyl phosphates, at a temperature of 50°–150° C., in a reaction vessel under autogeneous pressure. TBT may constitute the reaction medium, or a hydrocarbon solvent may be used. Ti/Mg molar ratios may vary from 1:0.1 to 1:1 although for the most homogeneous reaction system a stoichiometric relationship of $Ti^{IV}$ to $Mg°$ of 1:1 is preferred, with an amount of alkyl phosphate being about 1.5 mole per mole of Mg.

The hydrocarbon soluble catalyst precursor comprises predominently Ti values in association with Mg values, in one or more stereoconfigurational complexes believed to constitute principally oxygenated, at least partially reduced transition metal species. Some evidence of mixed oxidation states of the titanium values suggests an interrelated system of integral species of $Ti^{IV}$, $Ti^{III}$, and $Ti^{II}$ values perhaps in a quasi-equilibrium relation at least under dynamic reaction conditions. The preferred precursor is believed, without limitation, to incorporate (Ti—O—Mg) bridging structures.

The intermetallic compounds have special interest as catalyst precursors, in supported or unsupported systems, for isomerization, dimerization, oligomerization or polymerization of alkenes, alkynes or substituted alkenes in the presence or absence of reducing agents or activators, e.g., organometallic compounds of Group IA, IIA, IIIA or IIB metals.

In the preferred utilization of such precursors, they are reacted with a halide activator such as an alkyl aluminum halide, a silicon halide or a boron halide, and combined with an organometallic compound such as an aluminum alkyl to form a catalyst system adapted particularly to the polymerization of ethylene and comonomers, especially in slurry polymerizations to provide a range of useful resins from LLDPE to HDPE.

DETAILED DESCRIPTION OF THE INVENTION

The transition metal component is an alkoxide, normally a titanium or zirconium alkoxide, comprising essentially -OR substitutuents where R may comprise up to 10 carbon atoms, preferably 2 to 5 carbon atoms, and most preferably n-alkyl such as n-butyl. The selected component is normally liquid under ambient conditions and the reaction temperatures for ease of handling, and to facilitate use of titanium component is also hydrocarbon soluble.

It is generally preferred for facility in conducting the reaction to employ transition metal compounds which comprise only alkoxide substituents, although other substituents may be contemplated where they do not interfere with the reaction in the sense of detrimentally affecting performance in use. In general, the halide-free n-alkoxides are employed although, for example, di-n-butoxy titanium dichloride and the like may be suitably employed.

The transition metal component is provided in the highest oxidation state for the transition metal, to provide the desired stereoconfigurational structure, among other considerations. The term transition metal is used in its customary broad sense to denote the transition elements in which the penultimate electron shell is electron deficient, but is illustrated principally by reference to the readily available members of Group IVB. and VB of the Periodic Table. Other transition metals forming stable alkoxides useable in olefin polymerization or other catalytic processes may be employed as desired. Most suitably, especially for olefin polymerization, the alkoxide is a titanium or zirconium alkoxide. Suitable titanium compounds include titanium tetraethoxide, as well as the related compounds incorporating one or more alkoxy radicals including n-propoxy, iso-propoxy, n-butoxy, isobutoxy, sec-butoxy, tert-butoxy, n-pentoxy, tert-amyloxy, n-hexyloxy, n-heptyloxy, nonyloxy, and so forth. One or more transition metal alkoxides may be admixed for reaction, e.g., mixtures in all proportions of titanium and zirconium alkoxides may be used.

Some evidence suggests that the rate of reaction of the normal derivatives decreases with increasing chain length and the rate decreases with molecular complexity viz. tertiary, secondary, normal; hence these considerations may be taken into account in selecting a preferred derivative. In general, titanium tetrabutoxide has been found eminently suitable for the practice of the present invention, and related tetraalkoxides are likewise preferred. It will be understood that mixed alkoxides are perfectly suitable, and may be employed where conveniently available. Complex titanium alkoxides sometimes inclusive of other metallic components may also be employed.

The reducing metal is supplied at least in part in the zero oxidation state as a necessary element of the reaction system. A convenient source is the familiar turnings, or ribbon or powder. As supplied commercially, these materials may be in a passivated surface oxidized condition and milling or grinding to provide at least some fresh surface may be desirable, at least to control reaction rate. Such grinding or milling is not, however, a necessary step to the preparative process. Mixtures of reducing metals may also be conveniently employed particularly where the source of principal reducing metal is impure or is available as an amalgam with other metals, e.g., magnesium/aluminum. The reducing metal may be supplied as convenient, in the form of a slurry in the titanium component and/or hydrocarbon diluent, or may be added directly to the reactor.

The interaction of these components is conveniently carried out in an enclosed reactor, preferably coupled with reflux capacity for volatile components at the elevated temperatures produced in the reaction vessel. Autogenous pressure is employed, as the reaction proceeds smoothly under ambient conditions, with heating to initiate and maintain the reaction. As in any such reaction stirring is preferred simply to avoid caking or coating of vessel surfaces, to provide intimate admixture of components, and to ensure a homogeneous reaction system.

Usually, a hydrocarbon solvent such as hexane, heptane, octane, decalin, mineral spirits and the like is also used to facilitate intermixture of components, heat transfer and maintenance of a homogeneous reaction system. Saturated hydrocarbons are preferred, having a boiling point in the range of 60° to 190° C. The liquid transition metal component also may serve at least in part as the reaction medium, especially where no added solvent is employed. The reaction involves a stage where additional volatile components form azeotropes with the solvent, or if the components are employed neat, constitute the source of reflux, but in either case it is preferred at least to effectuate the reaction through intermediate stages with appropriate reaction times, to return volatiles to the reaction zone. Thus, butanol is generated when the titanium component is titanium tetra n-butoxide forming a azeotrope with the hydrocarbon solvent. Selection of solvent and/or alkoxide relative to possible suppression of reaction temperature is accordingly a consideration, as is known to one skilled in the art.

Reaction temperature will to some extent be a matter of choice within a broad range, depending upon the speed of reaction conveniently to be conducted. It has been found that the reaction system (constituted by the liquid transition metal component, alkyl phosphates, reducing metal particles and solvent, where desired) evidences visible gas generation at about 50°–70° C. suggesting an initiation temperature or activation energy level at about 50° C. which therefore constitutes the minimum necessary temperature for reaction of the polymeric oxide alkoxide with the reducing metal. As the alkanol generated is largely consumed in the course of the continuing reaction (as an independent species), the actual system temperature will change, and completion of the reaction is evidenced by consumption of visible metal and evolution of gas within a period of as little as 10–15 minutes to 4 hours or more. Such temperatures may reach 140°–190° C. and of course higher temperatures might be imposed but without apparent benefit. It is most convenient to operate within the range of 50°–190° C., preferably 70°–140° C. In the absence of solvent, the upper limit will simply be established by the reflux temperature for the alkanol generated in the course of the reaction.

Reaction of the components is most clearly apparent from the marked color change, with exotherm, that accompanies commencement of gas evolution. Where lack of opacity or turbidity of the solution admits observation, evolution of gas ranging from bubbling to vigorous effervescence is most evident at the surface of the magnesium metal, and the generally light colored solutions immediately turn greyish, then rapidly darker to blue, sometimes violet, usually blue black, sometimes with a greenish tint. Analysis of the gas evidences no HCl; and is essentially $H_2$. Following the rapid color change some deepening of color occurs during a gradual increase of temperature, with continuing gas evolution.

The reaction product is hydrocarbon soluble at least in part, and is maintained in slurry form for convenience in further use. The viscous to semi-solid product, when isolated, evidences on X-ray diffraction analysis, an essentially amorphous character. The color change and consumption of reducing metal is believed to evidence at least partial reduction of the transition metal, hence reference to reduced polymeric transition metal oxide alkoxides. While reference herein is made principally to the reducing potential of the metal, e.g., magnesium reactant, it is believed that the metal values themselves which are retained in the catalyst precursor contribute structurally and functionally to the catalyst characteristics. Thus, it is believed that the magnesium metal in its oxidized state forms a part of the oxide alkoxide structure, as aforesaid, for example, linking through oxygen to transition metal, viz., forming —TiOMg— linkages in the polymeric structure or, more generally, —TrOMr— wherein Tr represents transition metal and Mr is reducing metal.

Molar ratios of the components may vary within certain ranges without significantly affecting the performance of the catalyst precursor in ultimate use. Thus, to avoid competing reactions rendering the reaction product inconveniently gelatinous or intractable, the transition metal component is ordinarily supplied in at least molar proportion relative to the reducing metal, but the transition metal reducing metal ratio may range from about 0.5 to 1.0 to 3.0 to 1.0 or more, preferably 1/0.1–1/1. An insufficient level of reducing metal will result in suppression of the reaction temperature such that the reflux temperature of the pure solvent remains unattained; whereas an excess of reducing metal will be immediately apparent from the unconsumed portion thereof, hence the desired amount of this component is readily ascertained by one skilled in the art.

Within these ranges, a varying proportion of the reaction product may constitute a hydrocarbon insoluble component which, however, may be and commonly is slurried with the soluble component for use, e.g., further reaction with a halide activator to form an olefin polymerization catalyst. The amount of such insoluble component may be controlled in part by the use of a solvent with an appropriate partition coefficient but where use of a common hydrocarbon solvent such as octane is preferred for practical reasons, equimolar ratios of, e.g., Ti/Mg/alkyl phosphates have been found most adapted to the formation of a homogeneous reaction product.

The alkyl phosphates are also preferably supplied in molar ratio to the transition metal component, for similar reasons of homogeneity and ease of reaction. The molar equivalence of the alkyl phosphate is calculated on the basis of whether the phosphate is monoprotic or diprotic, for the former, equimolar, and the latter, 0.5 molar equivalence. When mixtures of mono- and diprotic alkyl phosphates are used, the molar equivalence is calculated on the basis of the percent of each species present in the mixture. More generally, the alkyl phosphates may range from about 0.66 to 3 moles per mole of transition metal. The full molar proportion of alkyl phosphates may be supplied at the commencement of the reaction or the compound may be added portionwise. The measured amount of alkyl phosphates is essentially in molar balance or molar excess relative to the reducing metal component and appears to be related to its consumption in the reaction, as a molar insufficiency will invariably result in excess reducing metal remaining. In general, a modest excess of alkyl phosphate of 10–40% is suitable to ensure complete reaction. Higher proportions are suitable without limitation but should be kept in relative stoichiometric balance to the transition metal component.

A metal salt is also present in the reaction mixture and may serve to dope the precursor with selected cations or act as a scavenger or exchange site for alkoxides. The preferred salts are those in which the cation is the same as the reducing metal, e.g., magnesium salts when magnesium is the reducing metal. Exemplary salts include magnesium chloride, magnesium acetate, magnesium sulfate, magnesium silicon fluoride, sodium acetate, aluminum chloride, magnesium acetylacetonate, calcium chloride, nickel chloride, and ferric chloride.

In a preferred aspect of the invention the reaction product (catalyst precursor) is further interreacted with a halide activator.

By 'halide activator' it is intended to denote a class of materials typified by the presence of halogen understood to be abstractable or exchangeable in interreaction with transition metal catalyst precursors (although the presence of transition metal-halogen bonding cannot be confirmed) and commonly employed in the Ziegler catalyst art, such as the alkyl aluminum halides, silicon halides, alkyl silicon halides, titanium halides, boron halides and alkyl boron halides. These compounds may or may not have reducing potential as, in accordance with the present invention, they are normally reacted with the polymeric transition metal oxide alkoxides in the reduced state, i.e., wherein the transition metal exists at least in significant part in a state below its maximum oxidation potential. In the latter case, the polymeric transition metal oxide alkoxide is reacted with the reducing metal prior to interreaction thereof with the halide activator, i.e., the reactions are carried out sequentially. The use of the reduced polymeric transition metal oxide alkoxides thus permits the utilization of such non-reducing halide activators as the silicon or boron halides, affording flexibility of operation and advantages such as reduced extractables in olefin resins produced therewith, e.g., isopentane extractables of less than 6 wt. %, preferably less than 3 wt. % for as-produced polyethylene. It has been found that the catalyst precursor may be activated readily, by merely combining the product with the halide activator. The reaction is vigorously exothermic, hence the halide activator is typically added gradually to the reaction system, which may be maintained with cooling, e.g., to 10°–13° C. for ease of handling.

The halide activator is commonly supplied for interreaction at a molar ratio of 3:1 to 6:1 (aluminum, silicon or boron, relative to the transition metal) although ratios of 2:1 or more have been used successfully. Normally, upon completion of addition, the reaction is also complete and may be terminated. The solid reaction product, or slurry may then be used immediately, or stored for future use. Usually for best control over molecular weight characteristics, and particularly for production of low density resin, only the hydrocarbon washed solid reaction product is employed as the catalyst, although the supernatant is also catalytically active. In such case, the halogenated precursor slurry is settled and decanted a number of times with relatively large volumes of hydrocarbon solvent. While any such solvent may be used, to avoid complexities in recovery or recycle the solvent for catalyst preparation, preferably n-octane is employed in the washing operation, in amounts of about 25:1 (wgt/wgt) of solvent to catalyst as transition metal.

The catalyst wash necessarily leads to some loss of transition metal values but reduces resin Cl$^-$ levels, minimizes reactor fouling and provides improved polymer morphology. Elemental analysis (wgt % of isolated solids) shows Ti 6.3%, Mg 11.4%, Si 5.1%, and Cl 46.8% for a 1/0.75/0.128 catalyst precursor formed from TBT/Mg°/MgCl$_2$.6H$_2$O, activated with 3/1 SiCl$_4$.

The resultant catalyst product may be used directly in the polymerization reaction although it is typically diluted, extended or reduced as required to provide in a convenient feed an amount of catalyst equivalent to 80–100 mg/transition metal based upon a nominal productivity of greater than 200,000 gm polymer/gm transition metal in continuous polymerizations which the present catalyst typically exceeds (e.g., 250,000 to 1,000,000 g/g). Adjustments are made by the artisan to reflect reactivity and efficiency, ordinarily by mere dilution, and control of feed rates.

The transition metal containing catalyst is suitably combined for use in olefin polymerization with an organometallic cocatalyst such as triethyl aluminum or triisobutyl aluminum or a non-metallic compound such as triethylborane. A typical polymerizer feed thus comprises 42 parts of isobutane solvent, 25 parts of ethylene, 0.0002 parts of catalyst (calculated as Ti), and 0.009 parts co-catalyst (TEA, Calculated as Al), provided to a reactor maintained at 650 psig. and 160° F. In general, the amount of co-catalyst, where employed is calculated to range from between about 30 to 50 ppm calculated as Al or B, based upon isobutane. In general, the activity of the catalyst is responsive to the molar ratio of the co-catalysts, i.e., high ratios of, e.g., Al/Ti into the range of 24/1 to 48/1 or more, correlate with higher activity levels.

Examples of metallic co-catalysts include trialkyl aluminums, such as triethyl aluminum, triisobutyl aluminum, and tri-n-octyl aluminum, alkyl aluminum halides, alkyl aluminum alkoxides, dialkyl zinc, dialkyl magnesium, and metal borohydrides including those of the alkali metals, especially sodium, lithium and potassium, and of magnesium, beryllium and aluminum. The nonmetal co-catalysts include boron alkyls such as triethyl borane, triisobutyl borane and trimethyl borane and hydrides of boron such as diborane, pentaborane, hexaborane and decaborane.

The polymerization reactor is preferably a loop reactor adapted for slurry operation, thus employing a solvent such as isobutane from which the polymer separates as a granular solid. The polymerization reaction is conducted at low pressure, e.g., 200 to 1000 psi and a temperature in the range of 100° to 200° F. with applied hydrogen as desired to control molecular weight distribution. The polymerization may nevertheless be conducted at higher pressures, e.g., 20,000 to 40,000 psi, in autoclave and tubular reactors, where desired.

Other n-alkenes may be fed to the reactor in minor proportion to ethylene, for copolymerization therewith. Typically, butene-1 or a mixture thereof with hexene-1 or octene-1 is employed, in an amount of 3 to 10 mol%, although other alpha olefin comonomers/proportions may be readily used. In utilizing such n-alkene comonomers, one may secure resin densities over the range from 0.91 to 0.96. Still other alpha olefin comonomers, such as 4-methyl-pentene-1, 3-methyl-butene-1, isobutylene, 1-heptene, 1-decene, or 1-dodecene may be used, from as little as 0.2% by weight, especially where monomer admixtures are employed.

In referring herein to an intermetallic "compound" or "complex" it is intended to denote any product of reaction, whether by coordination or association, or in the form of one or more inclusion or occlusion compounds, clusters, or other interengagement under the applicable conditions, the integrated reaction in general being evidenced by color change and gas evolution, probably reflective of reduction-oxidation, rearrangement and association among the unconsumed elements of the reaction system.

The following example further illustrates the invention.

EXAMPLE I

Technical grade dibutyl phosphate (DBP) is in a mixture of 55% (BuO)$_2$P(O)(OH) and 45% BuOP(O)(OH)$_2$ with a weighted molecular weight of 184.96 and 1.45 moles of (OH) per mole of phosphorus.

A mixture of 85.1 g (0.25 m) titanium tetrabutoxide 85.1 g octane, 4.56 g (0.1875 m) Mg turnings, 4.57 g (0.048 m) MgCl$_2$ and 24.51 (0.132 m) DBP was stirred in a reaction flask. On mixing, the temperature increased from 24° to 43° C. On heating to 48° C., the mixture changed to light purple color and gas evolution commenced. As the temperature was increased, the color darkened and gas evolution became more rapid to effervescence at 110° C. The color of the mixture was yellow brown at this point. Finally, at 127° C. a pea green liquid resulted and no further evolution of gas was noticed.

The reaction mixture was centrifuged to obtain a blue liquid and pea green precipitate. All of the magnesium had reacted as evidenced by the absence of magnesium turnings in the reaction vessel.

The reaction product may be activated in known manner with, e.g., an alkyl aluminum halide, a boron halide or a silicon halide by reaction therewith, conveniently at a molar ratio of about 3:1 to 6:1 (Al or Si/Ti) to provide, in combination with an organic or organometallic reducing agent, an olefin polymerization catalyst adapted to the formation of polyethylene resin.

Thus, the titanium-containing reaction product is combined with silicon tetrachloride at a molar ratio of 3:1 with cooling to 10°-13° C. Upon completion of the exothermic reaction, the solid reaction product may be hydrocarbon washed and stored or combined for use in olefin polymerization with, for example, triethyl aluminum or triisobutyl aluminum.

What is claimed:

1. An intermetallic compound comprising the reaction product of a transition metal and a reducing metal of a higher oxidation potential than the transition metal obtained by the reaction at elevated temperature of a polymeric transition metal oxide alkoxide and the reducing metal in the presence of a mono- or dialkyl phosphate or mixtures thereof in which each alkyl contains up to 10 carbon atoms.

2. The intermetallic compound of claim 1 wherein the transition metal is titanium or zirconium.

3. The intermetallic compound of claim 2 wherein the reducing metal is magnesium.

4. The intermetallic compound of claim 1 wherein the transition metal is titanium and the reducing metal is magnesium.

5. The intermetallic compound of claim 4 wherein said titanium and said magnesium are present in a molar ratio of from about 0.5:1 to about 3:1.

6. An intermetallic compound comprising metal values composed predominantly of titanium and magnesium values obtained by reaction at elevated temperature of a titanium alkoxide and magnesium metal in the presence of a mono- or dialkyl phosphate or mixtures thereof in which each alkyl group contains up to 10 carbon atoms for a period of time sufficient to consume the magnesium metal.

7. The intermetallic compound of claim 6 which is hydrocarbon soluble.

8. The intermetallic compound of claim 6 wherein said titanium alkoxide is titanium tetra n-butoxide.

9. The intermediate compound of claim 6 wherein each alkyl group contains up to 5 carbon atoms.

10. The intermediate compound of claim 6 wherein said phosphate is a mixture of mono- and dibutyl phosphate.

11. A catalyst component for polymerization of alpha olefins comprising the intermetallic compound of any of claims 1-6 further reacted with a halide activator selected from the group consisting of alkyl aluminum halides, silicon halides, alkyl silicon halides titanium halides, boron halides and alkyl boron halides.

12. The catalyst component of claim 11 wherein the molar ratio of said halide activator to said intermetallic compound is between about 2.5/1 to about 6/1 as Al/Ti, Si/Ti, Ti/Ti, or B/Ti.

13. A catalyst system for the polymerization of alpha olefins comprising the catalyst component of claim 11 and an organo aluminum compound.

14. The catalyst system of claim 13 wherein said organo aluminum compound is triethyl aluminum.

15. A catalyst system for the polymerization of alpha olefins comprising the catalyst component of claim 11 and an organo boron compound.

16. The catalyst system of claim 12 wherein said organo borane compound is triethyl borane.

17. A process for the preparation of an intermetallic compound which comprises reacting at elevated temperature a polymeric transition metal oxide alkoxide with a reducing metal of higher oxidation potential than the transition metal in the presence of a mono or dialkyl phosphate, or a mixture thereof, in which each alkyl group contains up to 10 carbon atoms for a period of time sufficient to consume the magnesium metal.

18. A process according to claim 17 wherein said transition metal is titanium or zirconium.

19. A process according to claim 18 wherein the reducing metal is magnesium.

20. A process according to claim 17 wherein the transition metal is titanium and the reducing metal is magnesium.

21. A process according to claim 17 wherein the product is further reacted with a halide activator.

* * * * *